United States Patent [19]

Mertens

[11] Patent Number: 5,426,968
[45] Date of Patent: Jun. 27, 1995

[54] ARRANGEMENT FOR DETERMINING THE TENSION IN A CHAIN USED IN A MINERAL MINING INSTALLATION

[75] Inventor: Wilfried Mertens, Lunen, Germany

[73] Assignee: Westfalia Becorit Industrietechnik GmbH, Germany

[21] Appl. No.: 47,546

[22] Filed: Feb. 23, 1993

[30] Foreign Application Priority Data

Mar. 10, 1992 [DE] Germany .......... 42 07 530.0

[51] Int. Cl.$^6$ ............................. G01L 1/22
[52] U.S. Cl. ................. 73/862.474; 73/862.473; 73/862.391; 73/862.194
[58] Field of Search .............. 299/34; 73/862.194, 73/862.391, 862.44, 862.473, 862.474, 862.541, 862.56, 862.57

[56] References Cited

U.S. PATENT DOCUMENTS

| | | | |
|---|---|---|---|
| 3,504,944 | 4/1970 | Holz et al. | 299/34 |
| 3,558,104 | 1/1971 | McGinty | 73/862.391 |
| 4,350,393 | 9/1982 | Heberling et al. | 200/50 |
| 4,389,072 | 6/1983 | Linke et al. | 299/32 |
| 4,887,991 | 12/1989 | Cwielong et al. | 474/92 |
| 5,053,315 | 7/1991 | Merten et al. | 73/862.39 |
| 5,055,092 | 10/1991 | Langenberg et al. | 475/2 |
| 5,171,065 | 12/1992 | Steinkuhl et al. | 299/34 |

FOREIGN PATENT DOCUMENTS

| | | | |
|---|---|---|---|
| 197706 | 9/1976 | U.S.S.R. | 299/34 |
| 197708 | 9/1977 | U.S.S.R. | 299/34 |
| 0829925 | 5/1981 | U.S.S.R. | 299/34 |
| 1535982 | 1/1990 | U.S.S.R. | 299/34 |
| 1569407 | 6/1990 | U.S.S.R. | 299/34 |

Primary Examiner—Richard E. Chilcot, Jr.
Assistant Examiner—Elizabeth L. Dougherty
Attorney, Agent, or Firm—Samuels, Gauthier & Stevens

[57] ABSTRACT

A drive station for a mineral mining installation employs a plough box containing a chain wheel around which a drive chain for a mineral winning machine, such as a plough, is entrained. The chain wheel is supported on a shaft rotatably supported by bearings in a casing or housing fitted to the plough box. An access opening in the plough box enables the chain wheel to be fitted onto or removed from the shaft and a collar of the casing engages on a fitting ring inside the opening which locates the plough box and the casing or housing. The ring has a radial projection which extends into a pocket adjoining the access opening and a pair of pins which employ strain gauges engage on the ring projection to provide electrical signals indicating the tension in the upper and lower runs of the chain.

13 Claims, 4 Drawing Sheets

ARRANGEMENT FOR DETERMINING THE TENSION IN A CHAIN USED IN A MINERAL MINING INSTALLATION

FIELD OF THE INVENTION

The present invention relates in general to mineral mining installations which employ a drive chain entrained around a chain wheel which is rotatably mounted for free rotation or for driving.

In such installations used, for example, for winning mineral, such as coal, the chain may propel a machine, such as a plough, which is used to strip mineral from a mineral face.

BACKGROUND TO THE INVENTION

It is known to measure the loading in the drives or gearing of known installations with the aid of measuring devices embodied as pins incorporating strain gauge sensors. The signals generated by the sensors are then used to monitor loading and can trigger an overload de-coupling means if the measured load rises above some threshold. Known types of measuring devices are described in U.S. Pat. Nos. 4,614,134 and 4,601,218.

In the case of chain driven ploughs it is necessary to pre-tension the endless drive chain to avoid harmful slackness and whipping on the one hand and to avoid excessive tension which increases wear. To obtain the right degree of pre-tension it is known to have a chain wheel which is displaced with a piston and cylinder unit. There is a need for a simple arrangement which is able to measure chain tension with sufficient accuracy to enable the pre-tensioning to be optimised and the dynamic tension to be monitored continuously. In one known arrangement, described in U.S. Pat. No. 5,037,315, the chain wheel is supported by a shaft in bearings in a housing for gearing driving the shaft. One bearing is fixed while the other is displaceable and bears on a ring which engages on force measuring devices with strain gauge sensors. There is a need for a simple yet reliable alternative to the use of a displaceable bearing.

An object of the invention is to provide an arrangement which is easy to fit and maintain without extensive modification yet enables an accurate measurement of chain tension.

SUMMARY OF THE INVENTION

In accordance with the invention a narrow plough box which accommodates a chain wheel around which is entrained a chain is mounted alongside a casing or housing containing bearings rotatably supporting a shaft carrying the chain wheel in outrigger fashion and the tension in the chain is determined by at least one force measuring device disposed outside the casing or housing in a location where the casing or housing is supported on the plough box. The casing or housing may contain gearing for driving the shaft or simply the bearings for rendering the shaft freely rotatable.

In a preferred construction there are two such force measuring devices associated with upper and lower runs of the chain. The location of the devices is chosen to correspond to the zones where the tensile forces in the chain runs, which act via the overhung chain wheel the shaft and the bearings thereof and hence through the casing or housing, react with the plough box. The devices may be embodied as rod-like elements such as pins incorporating strain gauge sensors, as known per se conveniently fitted into pockets or compartments in the plough box for easy installation and removal. The devices can be positioned in locations very close to the region where the chain passes onto and from the chain wheel which provides accurate measurements.

In a preferred embodiment the or each device is disposed near an access opening in the plough box from which the chain wheel is fitted onto or removed from the shaft. The associated casing or housing which contains the shaft is then located with a component fitting into the access opening. This component or some other associated part of the housing or casing can contact the or each device.

In a preferred arrangement the housing or casing is located with a ring fitted into the access opening and engaging on a collar of the casing or housing as is known from U.S. Pat. No. 4,887,991 and DES. 3,935,162. In accordance with the present invention, the access opening has a radial extension forming a pocket which receives a projection of the ring. This projection can then contact the or each force measuring device. The pocket can also accommodate a chain stripper used to guide and deflect the chain runs onto and from the chain wheel and the stripper can be coupled to the ring projection. The ring and its projection thus serves to locate and centralize the housing and casing with respect to the plough box and in conjunction with the or each measuring device provides means for determining the tensile forces in the chain.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
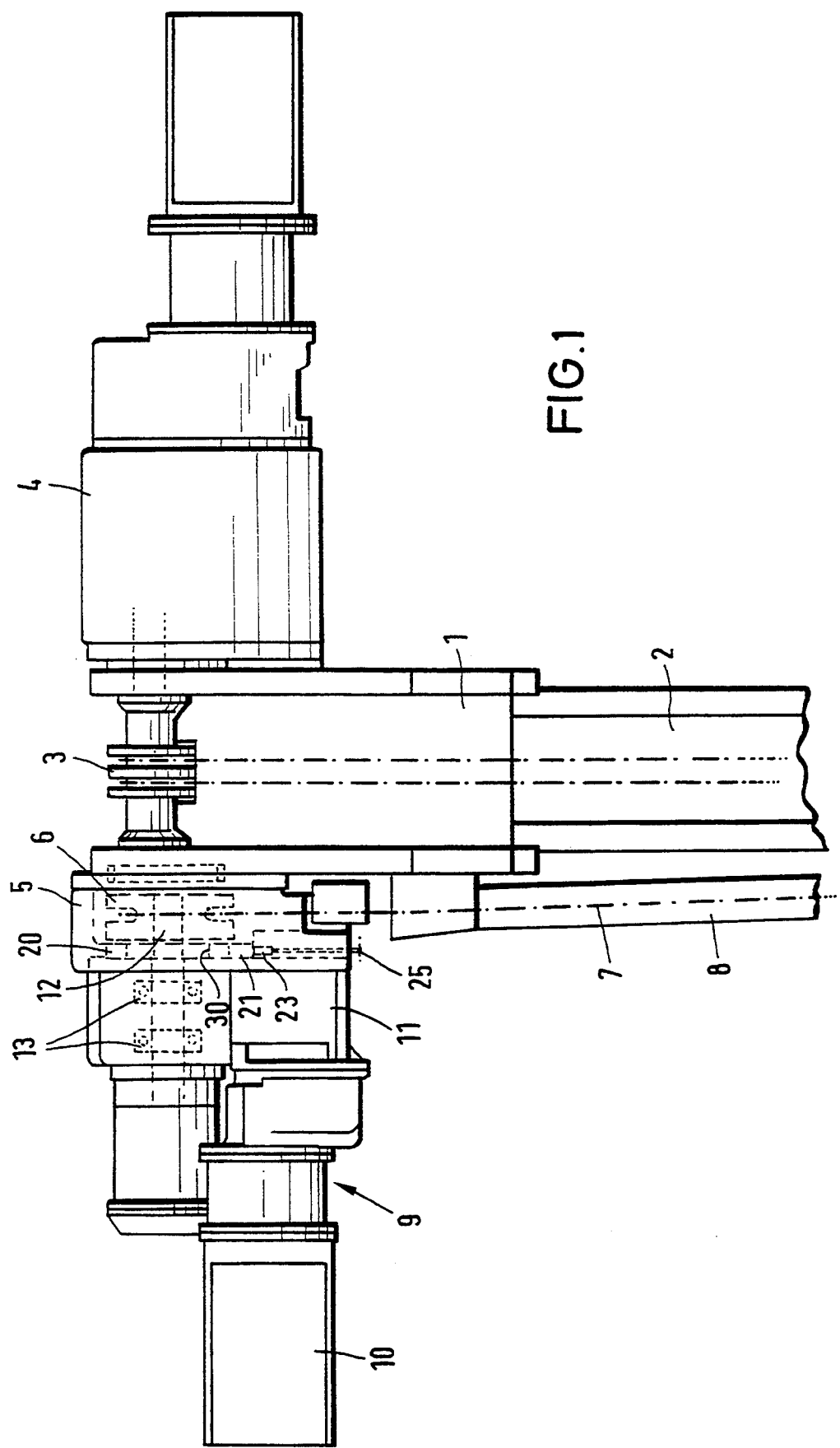
FIG. 1 is a plan view of part of the mineral mining installation, and more particularly a drive station for a scraper-chain conveyor and a mineral winning machine, employing an arrangement for measuring the tension in the drive chain for the machine constructed in accordance with the invention.

As shown in FIG. 1, a drive station of a mineral mining installation is composed of a frame 1 at the end of a channel section or pan 2 of a scraper-chain conveyor. The frame 1 rotatably supports a drum 3 around which a scraper-chain assembly represented in chain-dotted outline is entrained. The rotating drum 3 propels the scraper-chain assembly which circulates in upper and lower runs along the pans of the conveyor. The frame 1 has on one side a drive unit 4 for rotatably driving the drum 3 and hence the scraper-chain assembly. At the opposite side to the drive unit 4 the frame 1 has a so-called "plough box" 5 which houses a rotatable chain wheel 6 for driving and guiding a chain 7 used to propel a machine, such as a plough (not shown) back and forth along the conveyor to strip mineral from a mineral face alongside the conveyor. The conveyor is provided with a guide for the machine made up of guide sections 8 mounted to the mineral face sides of the pans of the conveyor. The chain wheel 6 is driven by a drive unit 9 composed of a drive motor, usually an electric motor 10, and a gearing assembly 11. The drive unit 9 is mounted on the side of the plough box 5 remote from the frame 1 and has an output shaft 12 rotatably supported by bearings 13 in a housing of the gearing assembly 11 on which the wheel 6 is fixed.

The plough box 5 may be constructed as described in U.S. Pat. Nos. 4,887,991 or DES. 3,935,162.

Figure 2:
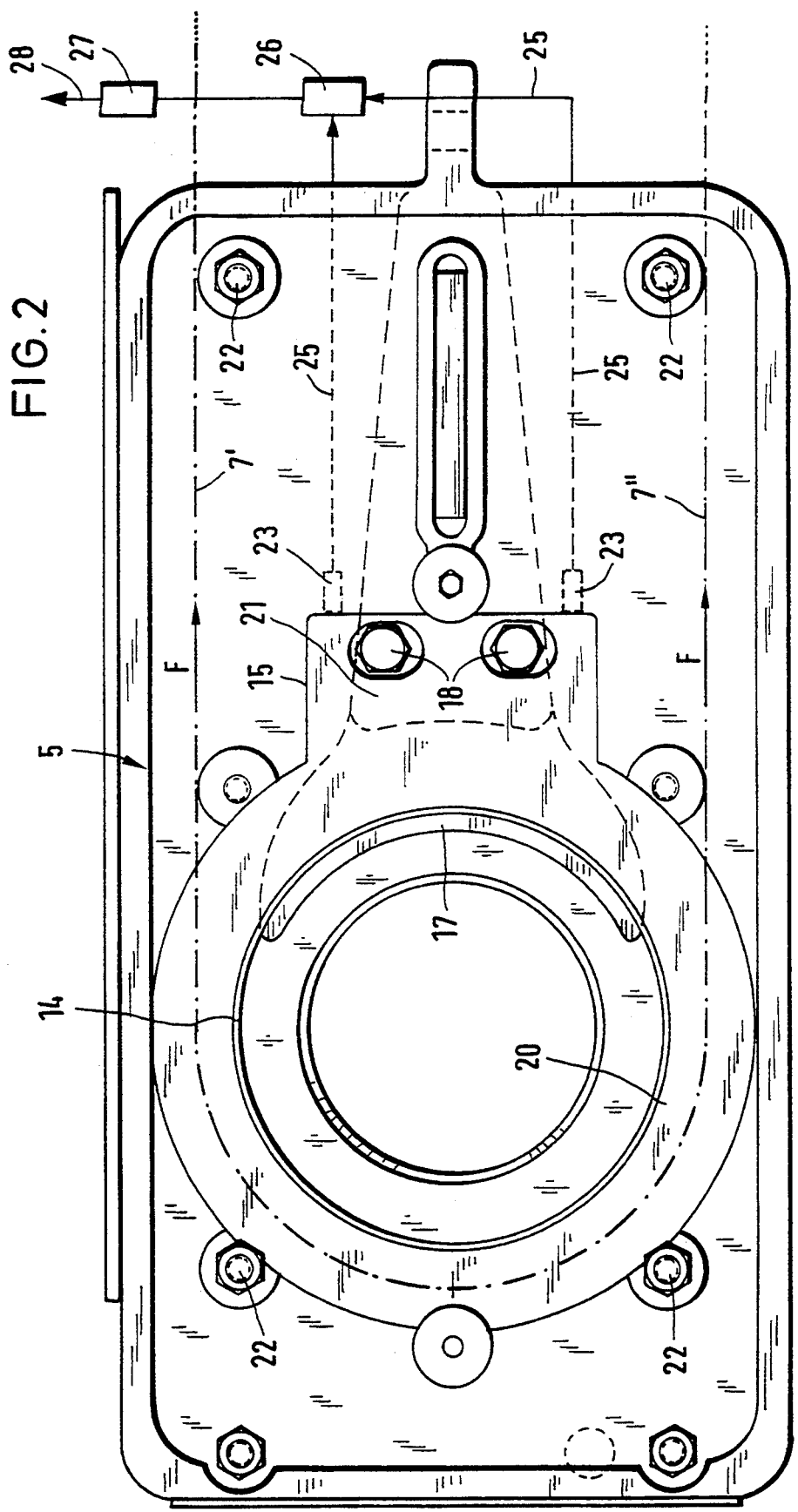
FIG. 2 is a side view of part of the drive station depicted in FIG. 1 and taken on a somewhat larger scale.
Figure 3:
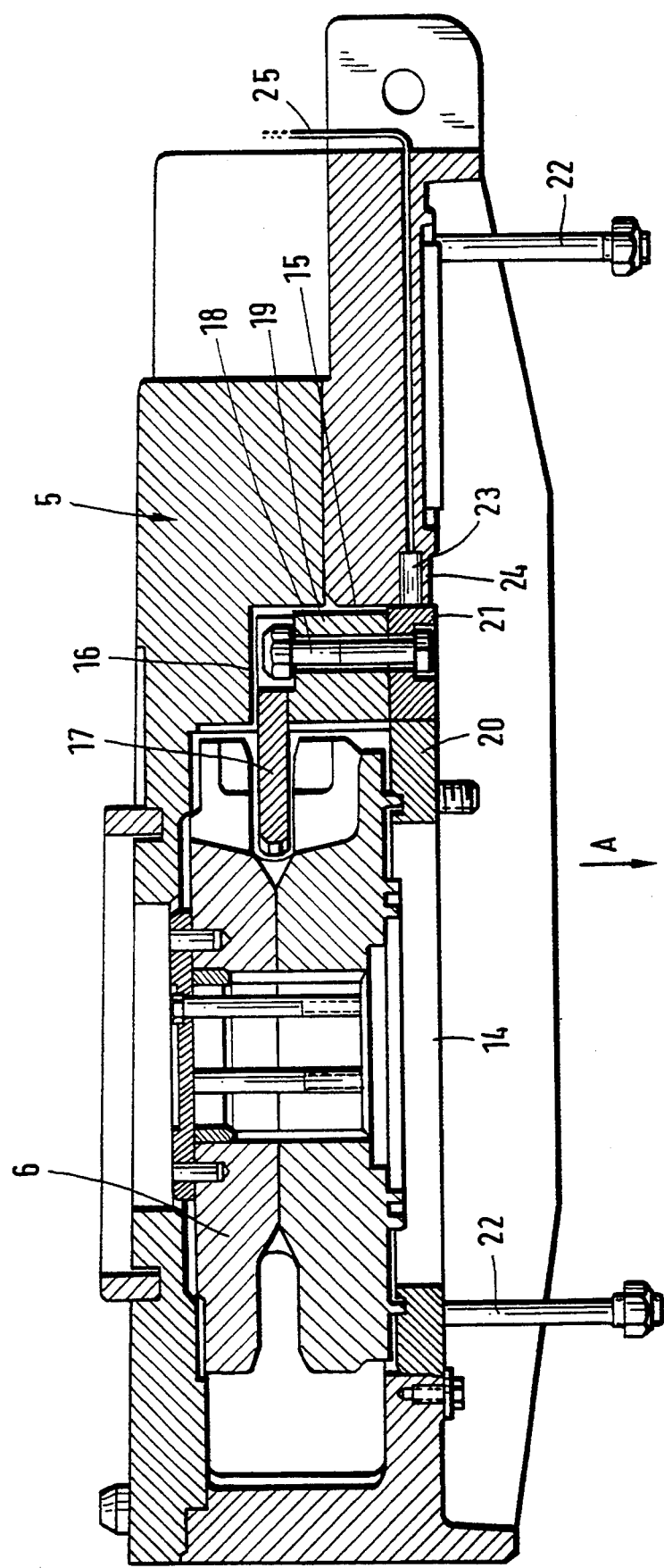
FIG. 3 is a sectional plan view of the part of the drive station shown in FIG. 2

As shown in FIGS. 2 and 3, the plough box 5 has a generally circular opening 14 at the side of the gearing assembly 11 which serves for the installation and removal of the chain wheel 6. The opening 14 is thus somewhat larger in diameter than the chain wheel 6. In FIG. 2 the chain 7 is represented in chain-dotted lines with the reference numeral 7' indicating the upper run and the reference numeral 7" the lower run. Depending on the direction of rotation of the chain wheel 6 one or other of the chain runs 7', 7" passes onto the chain wheel 6 while the other of the chain runs 7", 7' passes out from the chain wheel 6. The opening 14 has a radial extension 15 of generally rectangular shape disposed in the region of the chain wheel 6 where the chain runs 7', 7" pass onto or out from the chain wheel 6. This extension 15 forms a pocket 16 for accommodating a chain stripper 17 which guides and deflects the chain 7 onto and from the chain wheel 6. The stripper 17 is reliably attached with bolts 18 and is fixed to an insert 19 for release or otherwise. The insert 19 is seated in the pocket 16 and is shape-locked in the pocket 16 to prevent it from being displaced.

Within the opening 14 there is fitted a ring 20 which serves to locate and centralize the gearing assembly 11 relative to the plough box 5. The ring 20 has a radial projection 21 which matches the radial extension 15 of the opening 14. The projection 21 thus fits into the pocket 16 and engages alongside the insert 19. The projection 21 can be an integral part of the ring 20 or a separate component fixed, as by welding, to the ring 20. The stripper 17 may be secured to the projection 21 with the bolts 18 or to another component which interengages, e.g. in a recess with the projection 21.

The drive unit 9 is reliably connected to the plough box 5 with the aid of bolts or screws 22 which engage through bores in the plough box 5 and in the housing of the gearing assembly 11. The housing of the gearing assembly 11 has a collar which fits into the opening 14 and seats on the ring 20. When the drive unit 9 is coupled to the plough box 5 the tensile forces in the chain designated in FIG. 2 by arrows F are transmitted via the wheel 6 to the shaft 12 and the bearings 13 to the housing of the gearing assembly 11 and thence via the ring 20 back to the plough box 5. To ascertain the magnitude of the forces F measuring devices 23 are disposed above and below the axis of rotation of the chain wheel 6. The devices 23 are mounted in pockets 24 on the side of the plough box 5 adjacent the gearing assembly 11 so that the projection 21 of the ring 20 bears directly on the devices 23 to transmit forces thereto directly dependent on the chain tensile forces F. The devices 23 can take the form of rod-like elements, e.g. pins, provided with strain gauges designed to convert compressive strain into electrical signals. These signals from the devices 23 are transmitted along lines 25 to a distributor box 26 and thence to an amplifier 27 which provides an output 28 which can lead to a remote monitoring and/or control equipment, e.g. at a control station, for operating the mining installation.

The devices 23 are accessible from the outside and are advantageously mounted in the pockets 24 for easy removal or installation.

Once the screws or bolts 22 have been released the entire drive unit 9 together with the ring 20 and the stripper 17 and the chain wheel 6 can be pulled away from the plough box 5 in the direction of arrow A in FIG. 3.

Figure 4:
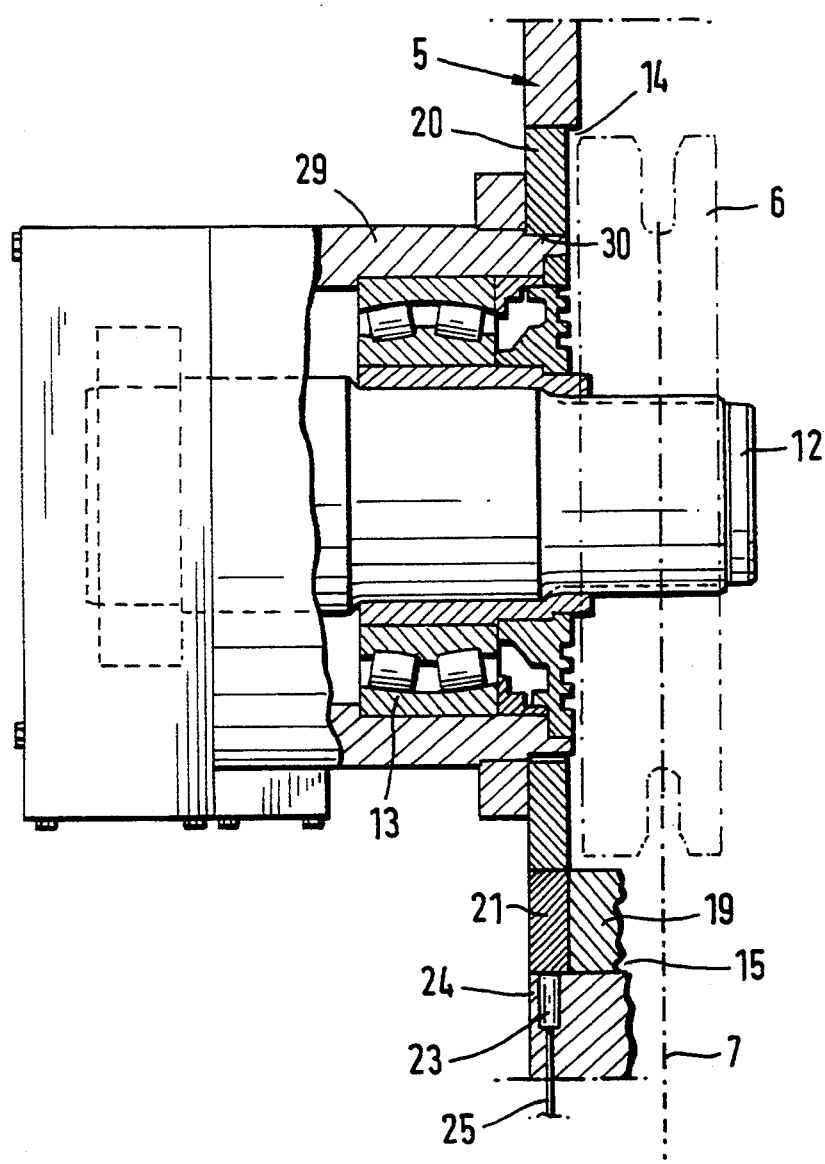
FIG. 4 is a sectional end view of part of a modified form of the drive station shown in FIG. 2.

FIG. 4 shows the use of a blind bearing casing 29 which is fitted to the plough box 5 instead of the gearing assembly 11. In this case the shaft 12 of the wheel 6 is not driven but is simply journalled in rolling element bearings 123. The casing 29 is installed again with the help of the ring 20 which is seated on the cylindrical surface 30 of the casing 29 facing the opening 14 and the surface 30 adjoins the projection 21 engaged on the devices 23. The construction and arrangement of the fitting ring 20 and the measuring devices 23 is generally as described in connection with FIGS. 1 to 3.

In both embodiments as described the devices 24 are disposed at a comparatively small distance from the wheel 6 loaded by the chain tensile forces. This permits highly accurate measurement of the tensile forces both in the case of the driven or the non-driven chain wheel 6. In the embodiments described the devices 24 are generally outside the casing 29 or the housing of the gearing assembly 11 at a position where the forces are transferred to the plough box 5. However, it is feasible to mount the devices 24 in some other way, for example on the casing 29 or housing of the gearing assembly 11, or on the fitting ring 20 or on some other component to achieve the same effect.

I claim:

1. In or for a mineral mining installation with a chain wheel in a plough box, a chain entrained around the chain wheel, a shaft carrying the chain wheel, a housing detachably fitted to and supported on the plough box, and one or more bearings in the housing for rotatably supporting the shaft, means for determining the tension in the chain, said means comprising at least one force measuring device supported by the plough box and disposed outside the housing in a location where the housing is supported on the plough box, whereby tensile forces in the chain are transmitted to the force measuring device through the chain wheel, the shaft and the housing.

2. An installation according to claim 1, wherein an opening is provided in the plough box through which access to the chain wheel for installation and removal is facilitated and there are two force measuring devices disposed at the periphery of the opening where the chain passes onto and from the chain wheel.

3. An installation according to claim 1, wherein an opening is provided in the plough box through which access to the chain wheel for installation and removal is facilitated and the housing is associated with a component engaging in the access opening and bearing on the force measuring device.

4. An installation according to claim 3, wherein the component is a ring provided with a region contacting the device.

5. An installation according to claim 4, wherein the housing has a collar engaging within the opening and on the ring to locate the housing relative to the plough box.

6. An installation according to claim 4, wherein the region of the ring contacting the device is a radial projection of the ring.

7. An installation according to claim 6, wherein a stripper is provided for deflecting and guiding the chain onto and from the chain wheel and wherein the projection of the ring is coupled to the stripper.

8. An installation according to claim 1, wherein the housing contains gearing driven to rotate the chain wheel.

9. An installation according to claim 1, wherein the housing is a casing of a blind bearing for the shaft.

10. An installation according to claim 1 wherein the device is detachably fitted in a pocket in the plough box.

11. An installation according to claim 1, wherein the device is a rod-like element incorporating a strain gauge sensor.

12. An installation according to claim 1, wherein there are two forces measuring devices located above and below an axis of rotation of the chain wheel to measure the tension in upper and lower runs of the chain.

13. In or for a mineral mining installation with a chain wheel in a plough box, a chain entrained around the chain wheel, a shaft carrying the chain wheel, a housing detachably fitted to and supported on the plough box, and one or more bearings in the housing for rotatably supporting the shaft, the improvement comprising:

an opening in the plough box through which access to the chain wheel for installation and removal is facilitated;

means for determining the tension in the chain, said means comprising at least one force measuring device disposed outside the housing in a location where the housing is supported on the plough box;

a ring engaged in the opening and having a region bearing on the force measuring device; and a collar on the housing engaged within the opening and on the ring to locate the housing relative to the plough box.

* * * * *